US006971040B2

(12) United States Patent
Volk (10) Patent No.: US 6,971,040 B2
(45) Date of Patent: Nov. 29, 2005

(54) METHOD AND SYSTEM FOR REDUCING THE EFFECTS OF SIMULTANEOUSLY SWITCHING OUTPUTS

(75) Inventor: Andrew M. Volk, Granite Bay, CA (US)

(73) Assignee: Intel Corporation, Santa Clara, CA (US)

(*) Notice: Subject to any disclaimer, the term of this patent is extended or adjusted under 35 U.S.C. 154(b) by 744 days.

(21) Appl. No.: 09/888,521

(22) Filed: Jun. 26, 2001

(65) Prior Publication Data

US 2002/0199126 A1    Dec. 26, 2002

(51) Int. Cl.[7] ............................................. G06F 1/04
(52) U.S. Cl. ...................................... 713/401; 713/503
(58) Field of Search ............................. 713/400, 401, 713/503

(56) References Cited

U.S. PATENT DOCUMENTS

| | | | | |
|---|---|---|---|---|
| 5,872,959 A | * | 2/1999 | Nguyen et al. | 713/401 |
| 5,987,619 A | * | 11/1999 | Hamamoto et al. | 713/401 |
| 6,037,810 A | * | 3/2000 | Woodward | 327/108 |
| 6,472,906 B2 | * | 10/2002 | Sanwo et al. | 326/83 |
| 6,629,250 B2 | * | 9/2003 | Kopser et al. | 713/401 |
| 6,708,238 B1 | * | 3/2004 | Rotker | 710/58 |
| 2002/0091958 A1 | * | 7/2002 | Schoenfeld et al. | 713/401 |

* cited by examiner

Primary Examiner—Dennis M. Butler
(74) Attorney, Agent, or Firm—Kenyon & Kenyon (57) ABSTRACT

A delay element is coupled to a first interface, which is coupled to a second interface via interconnect. Traces in the interconnect for propagating output signals from the first interface to the second interface have varying lengths. In order to reduce undesirable effects resulting from simultaneously switching the output signals, the delay element programmably and selectably delays the output signals according to the lengths of the traces they respectively travel to the second interface. Additionally, the effect of varying lengths of interconnect on receiver timings can be accommodated by using the delay element to programmably and selectably sample data at a receiver interface.

26 Claims, 7 Drawing Sheets

METHOD AND SYSTEM FOR REDUCING THE EFFECTS OF SIMULTANEOUSLY SWITCHING OUTPUTS

TECHNICAL FIELD

The present invention relates to data transfer in computer systems. More particularly, the present invention relates to a method and system for controlling the timing of signals propagated between interfaces of disparate physical widths.

BACKGROUND OF THE INVENTION

In typical computer systems, signals generated by a first functional logic block (for example, a memory controller) destined for a second functional logic block (for example, a memory) are transferred via clocked latches or buffers. The buffers are coupled to interconnect comprising routed "traces," i.e., conductive media such as copper wiring or print within a circuit board. Output signals from the buffers are switched at a given clock rate to propagate the signals, via the interconnect, from the first functional block to the second.

Traces in the interconnect have varying lengths depending upon the points they are connected between. Thus, signal propagation times or "flight times" from the switched buffers vary, corresponding to the length of the trace they must travel in the interconnect. To maintain timing integrity, operations on data transferred over the interconnect must accommodate the longest trace (and correspondingly slowest signal) of the interconnect.

In many systems, the output buffers are clocked off the same clock and consequently switch simultaneously (an effect called "simultaneously switching outputs" (SSO)). However, SSO has effects which tend to degrade system performance. In particular, SSO causes large, rapid current changes which, in view of the known relation V=L(di/dt), generate voltage drops (ringing) across inductances present in the system circuitry. Such voltage drops cause the switched buffers to become power-starved. This causes the buffer delays to increase, or "push out." The SSO noise on the power lines can also cause other signals on the same power delivery network as the switched buffers to switch in error. If these other signals are clocks, the erroneous switching can generate timing problems in the system.

As noted above, trace lengths in interconnect typically vary. Thus, while with SSO the output buffers switch simultaneously, the output signals in many cases do not arrive at the receiving end of the interconnect simultaneously. This phenomenon is particularly prevalent in the case of narrow-to-wide interfaces; i.e. interfaces wherein a substantial degree of "fan-out," or widening is exhibited in the interconnect from one interface to another. The fan-out is due to a physical widening in the space the traces occupy, usually as a result of the spacing between the traces increasing to meet the width of the second functional block.

As further noted above, the timing at a receiving end of interconnect is dictated by the slowest signal propagated by the interconnect; i.e., the signal propagated on the longest point-to-point path of the interconnect. Accordingly, a time margin exists, proportional to the difference in flight time between the fastest signal and the slowest signal, during which none of the signals can be used. Instead, the faster signals must wait for the slower signals to "catch up." The timing push-out caused by SSO only exacerbates the worst case min-max in timing difference.

Thus, techniques have been developed to exploit this time margin to reduce the undesirable effects of SSO. According to such techniques, output buffers are switched in a staggered or phased fashion, as opposed to simultaneously. This has the effect of spreading out the L(di/dt) voltages over a wider time interval, reducing some of the detrimental consequences of SSO.

However, such techniques tend to be inflexible or constrained in their application, because they are not adaptable to the different ranges and patterns of trace lengths that can result from particular board layouts.

A complementary problem associated with varying trace lengths in a board layout involves the sampling of data arriving at a receiver interface, as opposed to data transmitted from an output or driver interface. When a data signal or group of data signals arrive at a receiver interface, there is a period of time known as a "data valid" period during which the signal must be sampled. Ideally, to avoid timing complexity, the "data valid" period for all of the signals of an interface would overlap, so that all of the signals could be sampled at the same time. However, this is typically not possible because of the different arrival times of the signals depending on the trace lengths imposed by a particular board layout. In particular, the "data valid" period of some signals or groups of signals may not overlap with the "data valid" period of any other signals or groups of signals. Thus, multiple sampling clocks must be typically be used to sample signals arriving at a receiver interface, depending upon when their "data valid" period occurs.

Techniques are known for arranging sampling times in accordance with the arrival times of signals. However, as with known methods for handling the effects of SSO, techniques for arranging sampling times are not readily adaptable to the different ranges and patterns of trace lengths that can result from particular board layouts.

In view of the foregoing considerations, a more flexible and adaptable approach, both for ameliorating the effects of SSO at an output or driver interface, and for simplifying data sampling at a receiver interface, is called for.

DETAILED DESCRIPTION

Embodiments of the invention may provide a programmable delay element coupled to an output or driver interface and programmed to delay switching of signals output by the driver interface by an amount of time corresponding to respective lengths of traces traveled by the signals to a (typically wider) receiver interface. A delay value assigned to the switching of a signal propagated by a particular trace may be tuned with other delay values to bring the signals into synchronism at the receiver interface.

According to other embodiments of the invention, a programmable delay element may be provided at a receiver interface. The delay element may be programmed to sample signals at times corresponding to respective lengths of traces traveled by the signals to the receiver interface.

Figure 1:
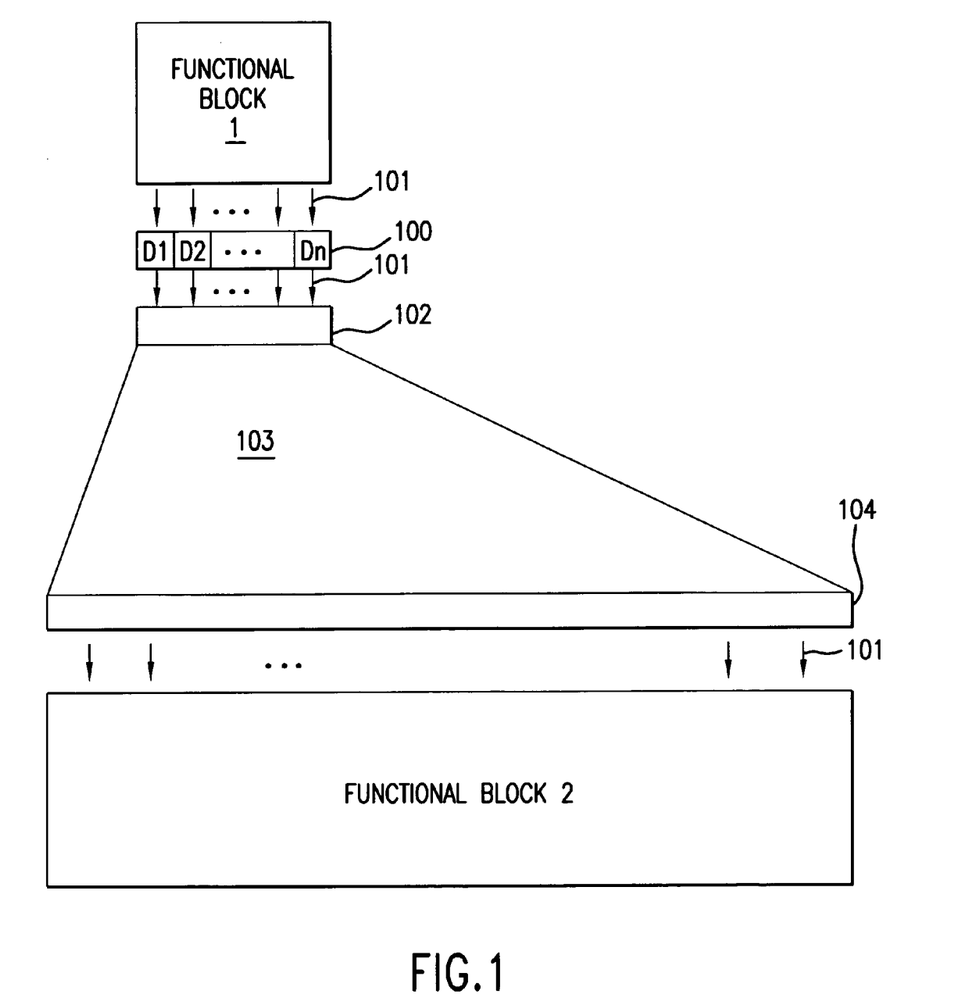
FIG. 1 shows elements of a computer system including a delay element according to an embodiment of the invention.

An embodiment wherein a programmable delay element may delay signals of an output or driver interface will be described first. FIG. 1 illustrates such an embodiment. In FIG. 1, a first functional block 1 of a computer system sends signals 101, for example, a plurality of data bits, to a second functional block 2. Physical media for propagating the signals include an interface 102 of the first functional block 1, interconnect 103 comprising traces, and an interface 104 of the second functional block.

Delay element 100 may be coupled to interface 102. To take advantage of the time difference between the slowest and fastest signals, delay element 100 may introduce programmable, selectable delays according to the length of a trace traveled by a signal. In embodiments, the delay may be inversely proportional to the length of the trace. That is, the shorter the trace, the longer the delay, in order that a signal propagated by the trace arrives at the receiver interface 104 at about the same time as a signal propagated by a longer trace.

Optimally, respective delays introduced span the time difference between respective signals and the slowest signal. A delay smaller than this time difference leaves some (smaller) time range unusable by the system. A delay larger than the time difference increases total delay in the system, which is undesirable. Thus, for signals traveling the longest trace or traces, the delay element may introduce no delay.

In embodiments, delay element 100 may comprise a plurality of different delay values D1, D2, . . . Dn. Each of signals 101 may be assigned a different delay value. Alternatively, each of pluralities of grouped signals may be assigned one of delay values D1, D2, . . . Dn. For example, delay element 100 might comprise 8 different delay values D1–D8, or 16 different delay values D1–D16. A first group of signals in an interface with the same or similar flight times might be assigned a delay value D1, while a second group of signals with the same or similar flight times different from those of the first group might be assigned a delay value D5, or D11, or the like.

The delays D1, D2, . . . , Dn of the delay element 100 may be programmable and selectable to make the delay element adaptable to various design layouts. That is, because the distribution of trace lengths varies depending on a design layout, the delays assigned to particular signals or groups of signals need to reflect the layout, and accordingly embodiments of the invention enable the delay element to be adjusted for, or tailored to a particular layout. More particular examples of design layouts and embodiments of the invention follow to illustrate the foregoing.

Figure 2:
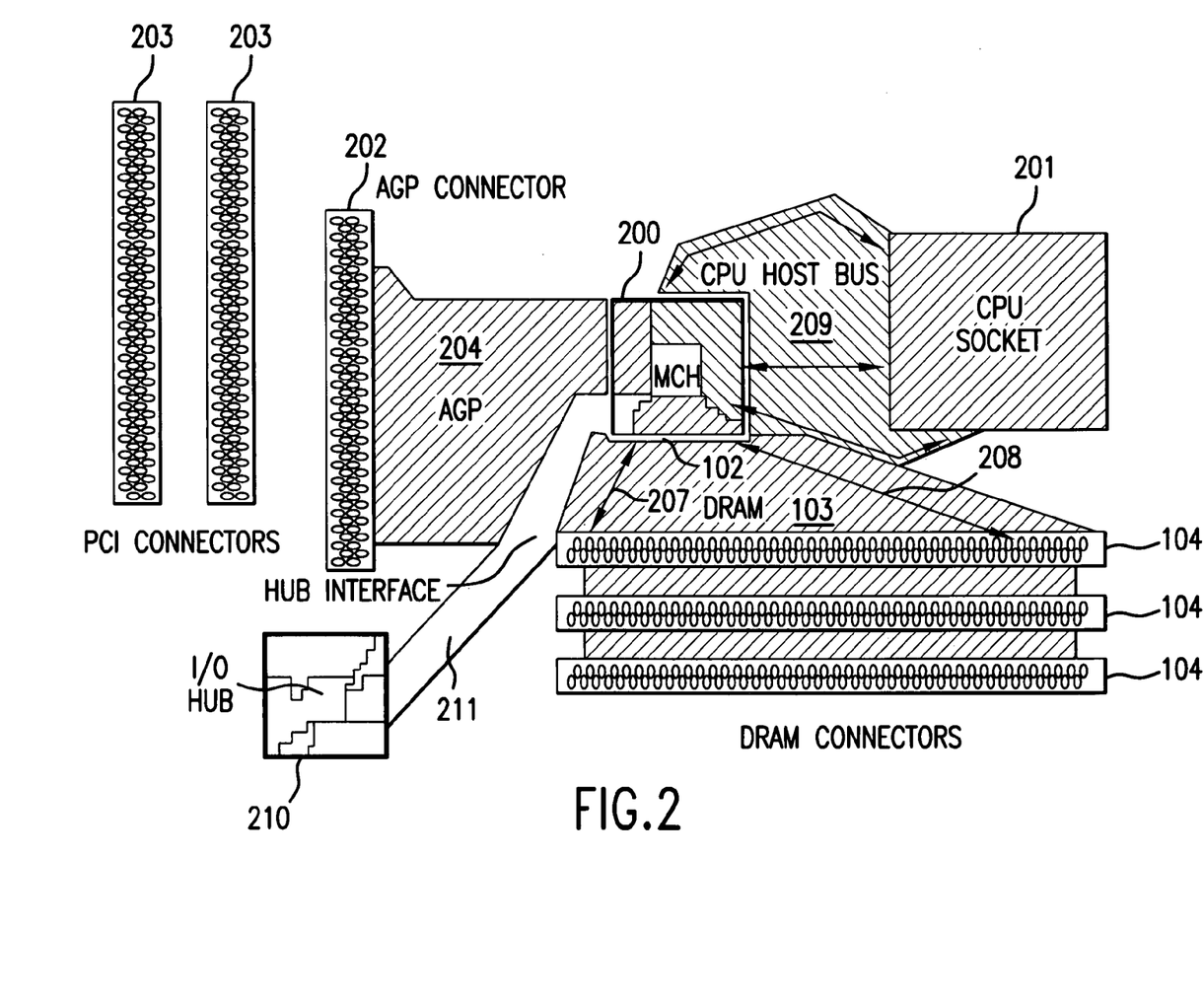
FIG. 2 shows an example of a layout of a circuit board of a personal computer.

FIG. 2 shows a plan view of a typical layout of a personal computer (PC) circuit board commercially available from the Intel® corporation. The layout includes PCI (Peripheral Component Interconnect) connectors 203 and AGP (Accelerated Graphics Port) connector 202. AGP connector 202 is connected to the memory controller hub 200 (MCH) via interconnect 204. I/O hub 210 is connected to the MCH 200 via the hub interconnect 211. The I/O hub also connects to the PCI connectors, IDE (Integrated Drive Electronics) connectors, and other I/O devices (not shown).

The MCH is connected to the central processing unit (CPU) 201 by the CPU host bus interconnect 209. The CPU executes instructions which result in memory addresses being transmitted to the MCH 200, for the MCH to use in accessing memory or I/O.

The MCH has an interface 102 to interconnect 103, and interconnect 103 has an interface to memory via a second interface, i.e., DRAM (dynamic random access memory) connectors 104. DRAM connectors 104 are typically used to plug in physical memory such as dual inline memory modules (DIMM).

Interconnect 103 comprises a plurality of traces extending between the MCH and the DRAM connectors. The traces propagate signals from the MCH to the physical memory, by way of the DRAM connectors. The traces are of varying lengths, as illustrated by bi-directional arrows 207 and 208. More particularly, because of the physical disparity in width between the interface 102 of the MCH and the DRAM connectors 104, there can be substantial fan-out in the interconnect from the MCH to the DRAM connectors. To accommodate the disparity in widths, a trace or traces near a left edge of the interconnect may be on the order of 2 inches long, while a trace or traces near a right edge of the interconnect may be on the order of 6 inches long. Traces between the left and right edges of the interconnect may accordingly exhibit a range of lengths between 2 and 6 inches. In this regard, the layout of a PC circuit board is well-known.

The shape of the CPU host bus interconnect 209 illustrates another example of a case where board layout necessitates disparate trace lengths. The shape of interconnect 209 is due in part to fan-out occasioned by the difference in size between the MCH and CPU packages, and in part to the need to route the interconnect around corners.

Figure 3:
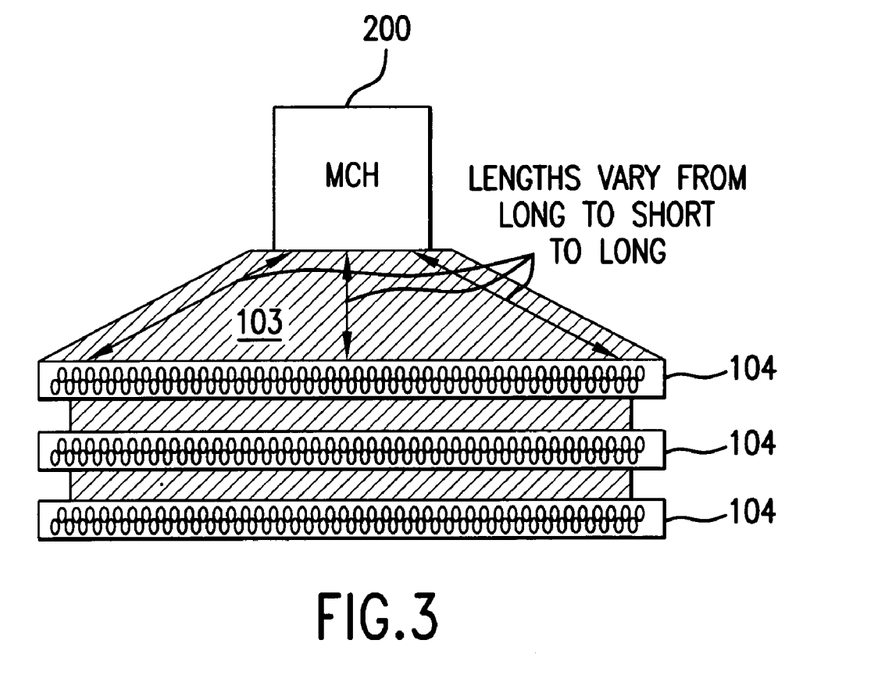
FIG. 3 shows another example of a layout of a circuit board of a personal computer.

Another example of a possible circuit board layout for a PC is shown in FIG. 3. In FIG. 3, the MCH 200 is more centered with respect to DRAM connectors 104 than in FIG. 2. Thus, due to the fan-out from the MCH to the DRAM connectors, traces may range (in a left-to-right direction across the interconnect) in length from comparatively long, to comparatively short, to comparatively long again.

Figure 4:
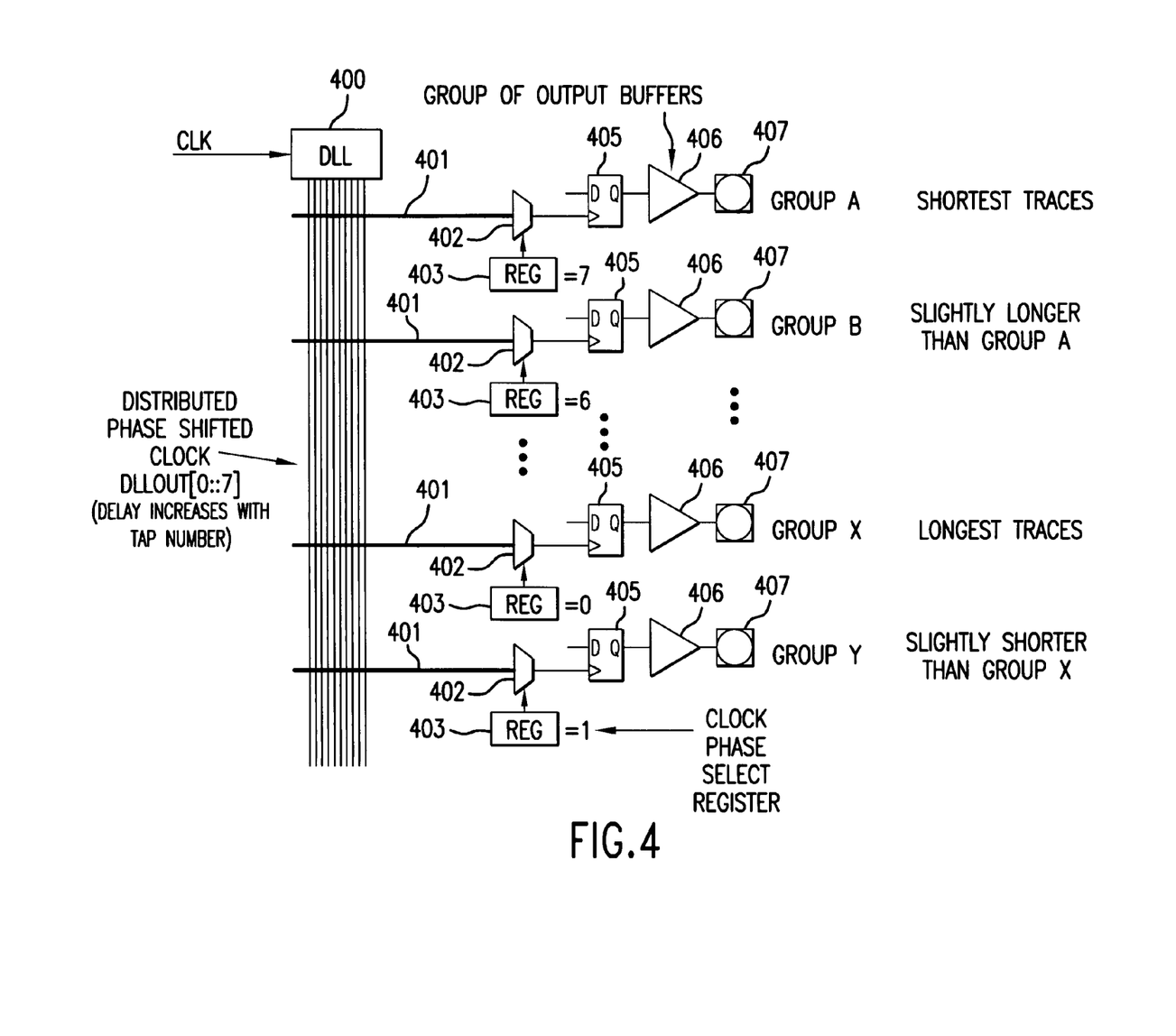
FIG. 4 shows one possible embodiment of a delay element at an output or driver interface according to the invention.

The principles of the present invention may be integrated with these systems. According to an embodiment of the invention, a delay element may be coupled to an interface of the MCH. FIG. 4 shows one possible embodiment of a delay element according to the invention. In the embodiment of FIG. 4, the delay element comprises a delay locked loop (DLL) 400 with 8 delay outputs DLLOUT0–7. The delay outputs may be coupled by connections 401 and MUXes 402 to an output or driver interface comprising edge-triggered latches 405, drivers 406, and pads 407 of a clocked output buffer. Each group of elements 405, 406, 407 is intended to represent either a single output buffer, or a group of output buffers. Programmable registers 403 act as control inputs to the MUXes, enabling a particular delay output to be selected for input to the interface.

The clock inputs of the latches may each be connected to an output of the MUXes 402. The data inputs "D" of the latches may be connected to some data source, not shown, such as an internal address or data path in the MCH 200. The outputs "Q" of the latches may be coupled to drivers 406, which in turn may be coupled to output pads 407. The output pads 407 may be coupled to traces in interconnect.

According to the embodiment of FIG. 4, the DLL 400 is configured to output different delays DLLOUT0–7. The DLL 400 uses active feedback to control and stabilize its delays. DLLs such as DLL 400, and techniques for causing them to produce a desired set or range of delays, are known. For example, the DLL may be configured to phase shift a clock signal ("CLK") by arbitrary amounts. The phase shifts could be set at selected intervals in accordance with variations in trace lengths of the interconnect. A phase shift may be determined so that the resulting delay in switching is inversely proportional to a length of a trace connected to an output buffer.

Phase shifting introduced by delay outputs DLLOUT0–7 could cause each output buffer or buffers to be switched at a selected time, offset from the switching time of the other buffers. For example, if the difference in signal flight time between the shortest and longest traces of the interconnect was on the order of 1.5 ns, the DLL might be configured such that the output buffer or buffers connected to DLLOUT0 were switched by the CLK signal (i.e., no delay), while the output buffer or buffers connected to DLLOUT1 were switched around 0.21 ns later than the DLLOUT0 buffers, the output buffer or buffers connected to DLLOUT2 were switched around 0.21 ns later than the DLLOUT1 buffers, and so on. The delays could be determined such that the signals connected to DLLOUT0–7, respectively, were synchronized at the receiver end of the interconnect (i.e., arrived at the receiver interface substantially simultaneously), and such that the cumulative delay of the phase shifts on outputs DLLOUT0–7 would be on the order of 1.5 ns. The switching intervals could be offset, i.e., spread across the overall 1.5 ns interval, so that the effects of SSO are reduced. The switching intervals need not be uniformly spaced as in the foregoing example.

In FIG. 4, four groups of buffers, Groups A, B, X and Y have been arbitrarily designated to provide an illustrative example. Pads 407 of the buffers may be connected to traces in interconnect. For example, a plurality of pads 407 of Group A may be connected to the shortest traces in the interconnect. A plurality of pads of Group B may be connected to traces which are slightly longer than the traces to which Group A are connected. Pads of Group X may be connected to the longest traces, and pads of Group Y may be connected to traces which are slight shorter than the traces to which Group X are connected.

Figure 5:
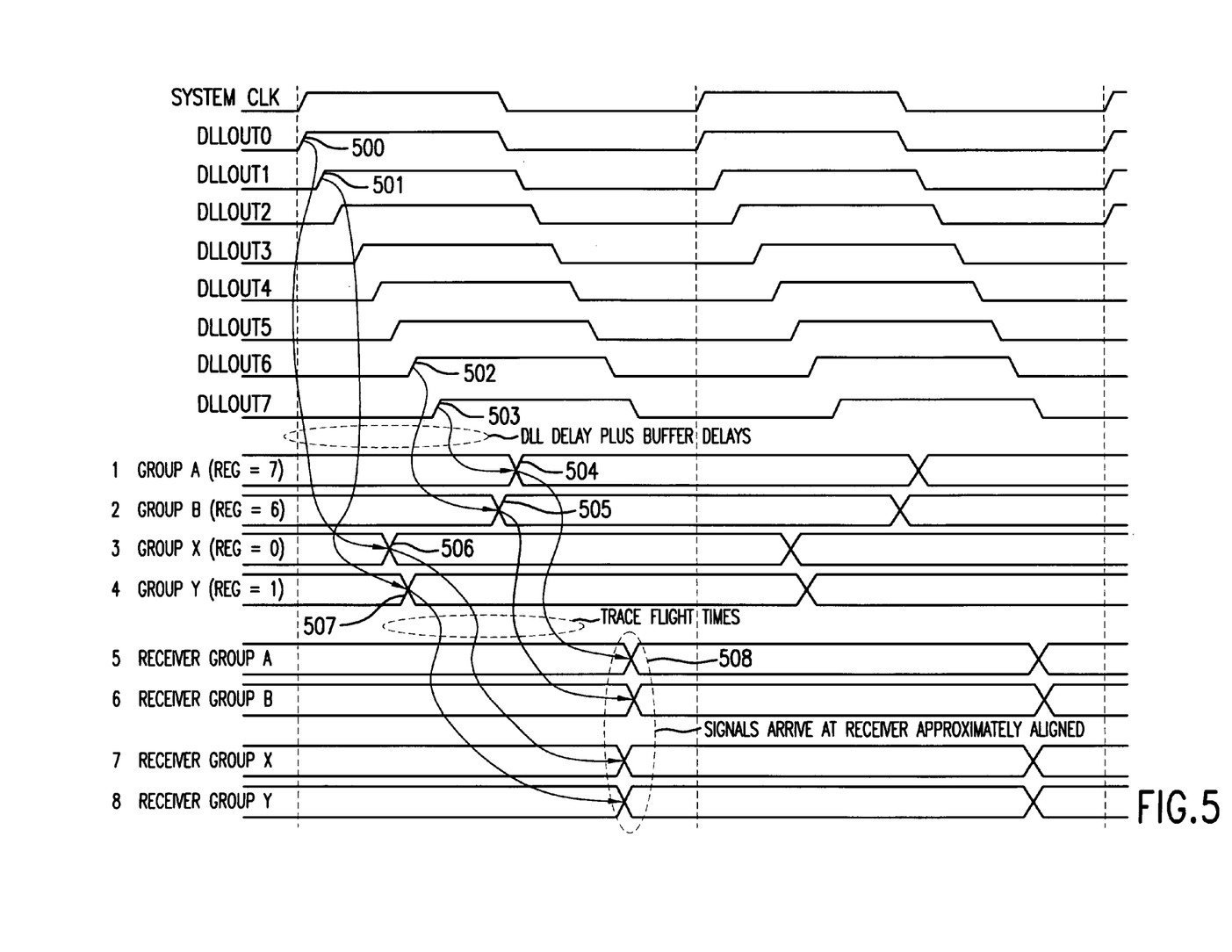
FIG. 5 shows a timing diagram for signals corresponding to the embodiment illustrated in FIG. 4.

FIG. 5 is a timing diagram showing one possible arrangement of phase-shifted clock signals for switching output buffers for the example driver interface shown in FIG. 4. Lines 1–4 of FIG. 5 show switching times for the Group A, B, X and Y buffers. Because the Group X buffers are connected to the longest traces, the control register 403 corresponding to the Group X buffers may be programmed to a value of 0, in order to connect the Group X buffers to the DLLOUT0 delay output. The DLLOUT0 output coincides with the system "CLK" signal (i.e., the DLLOUT0 output introduces no delay) so that a switching 506 of the Group X buffers occurs at a rising edge 500 of the DLLOUT0 output signal, following any intrinsic buffer delay. Along these lines, because the Group Y buffers are connected to traces which are slightly shorter than the traces of Group X, the control register 403 corresponding to the Group X buffers may be programmed to a value of 1, in order to connect the Group Y buffers to the DLLOUT1 delay output. The DLLOUT1 output introduces a slight delay. Thus, a switching 507 of the Group Y buffers occurs at a rising edge 501 of the DLLOUT1 output signal, following any intrinsic buffer delay.

Similarly, because the Group A buffers are connected to the shortest traces, the control register 403 corresponding to the Group A buffers may be programmed to a value of 7, in order to connect the Group A buffers to the DLLOUT7 delay output. The DLLOUT7 output introduces the most delay. Thus, a switching 504 of the Group A buffers occurs at a rising edge 503 of the DLLOUT7 output signal, following any intrinsic buffer delay. Along these lines, because the Group B buffers are connected to traces which are slightly longer than the Group A traces, the control register 403 corresponding to the Group B buffers may be programmed to a value of 6, in order to connect the Group B buffers to the DLLOUT6 delay output. The DLLOUT6 output introduces slightly less delay than the DLLOUT7 delay output. Thus, a switching 505 of the Group B buffers occurs at a rising edge 502 of the DLLOUT6 output signal, following any intrinsic buffer delay.

Due to the respective delays introduced, the Group A, B, X and Y signals may arrive at the receiver interface at substantially the same time, as shown in dashed ellipse 508.

It may be appreciated in view of the foregoing that the timing of switching could be readily tailored to any distribution of trace lengths that was exhibited in a particular board design layout, by setting the desired switching intervals and by programming the control registers 403 to select the desired switching time for a particular buffer or group of buffers. The programming of the control registers could be done, for example, by software. In an embodiment, the software could be the BIOS (Basic I/O System) program which is commonly executed to initialize computer systems. Use of the BIOS program may be advantageous in that a particular BIOS program is associated with a particular board layout, and therefore the layout and the order of the interconnect lengths are known a priori.

Other possible embodiments of a delay element according to the invention would be a chain of inverters or buffer elements driven by the CLK signal. Such embodiments may offer greater ease of implementation and lower cost, but may suffer from less stable delays over silicon process, temperature and voltage.

Figure 6:
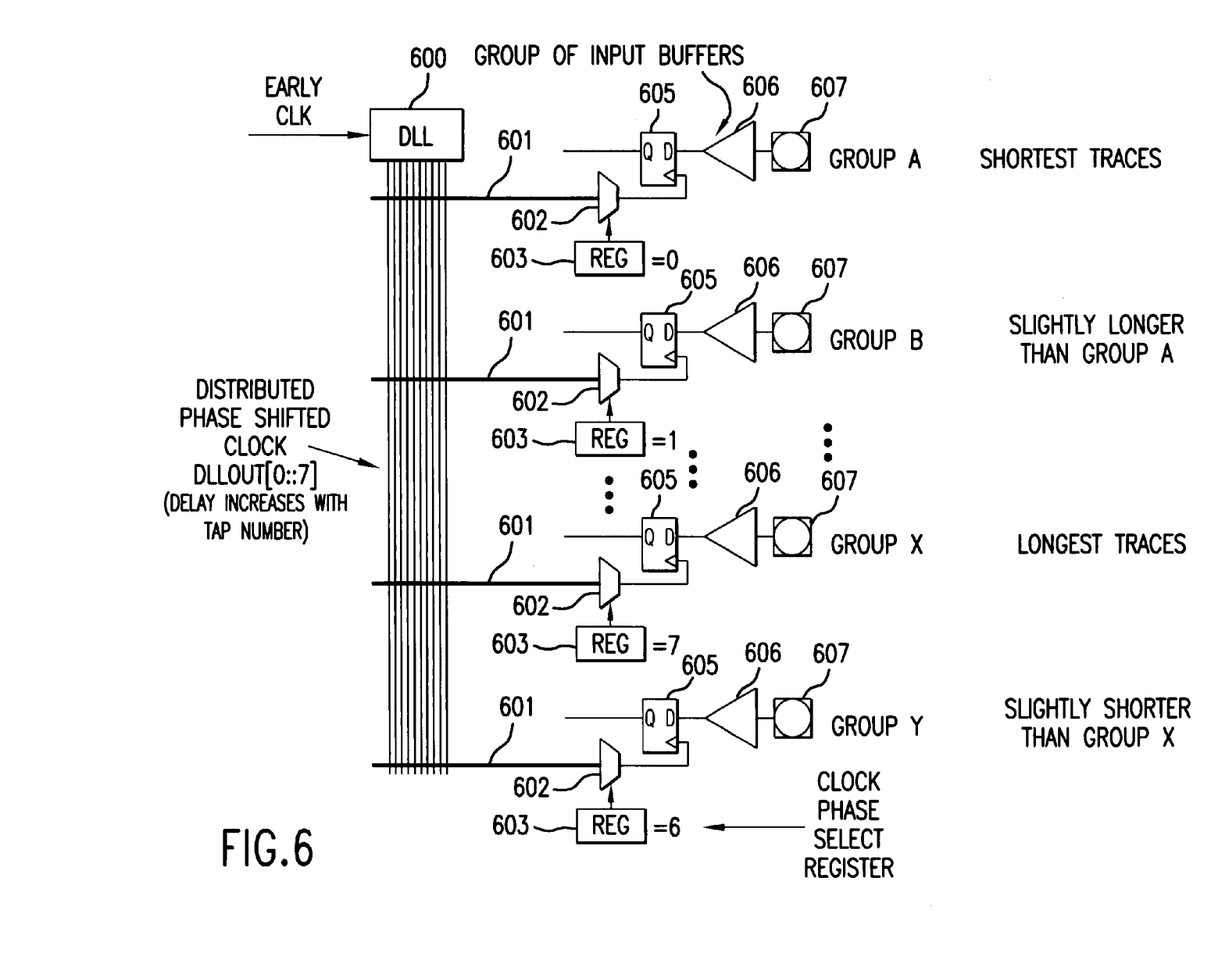
FIG. 6 shows a possible embodiment of a delay element at a receiver interface.

Whereas FIGS. 4 and 5 show an embodiment of the invention at an output or driver interface, FIG. 6 illustrates an embodiment wherein a programmable delay may be included at a receiver interface. Such an application of a programmable delay may be useful in coordinating data sampling times at the receiver interface. As described above, because signals arriving at a receiver interface may arrive at different times depending upon the length of the respective traces they travel, setting the appropriate sampling times in order to acquire the signal values can present difficulties.

In the embodiment of FIG. 6, the delay element comprises a delay locked loop (DLL) 600 with 8 delay outputs DLLOUT0–7. The delay outputs may be coupled by connections 601 and MUXes 602 to a receiver interface comprising edge-triggered latches 605, input amplifiers 606, and pads 607 of a clocked input buffer. Each group of elements 605, 606, 607 is intended to represent either a single input buffer, or a group of input buffers. Programmable registers 603 act as control inputs to the MUXes, enabling a particular DLL output to be selected for input to the interface. The MUX outputs may be used as sampling clocks for the input buffers to latch the data values at the pads 607.

According to the embodiment of FIG. 6, the DLL 600 is configured to output different delays. For example, the DLL may be configured to phase shift a clock signal ("early CLK") by arbitrary amounts. The phase shifts could be set at selected intervals in accordance with variations in trace lengths of the interconnect. A phase shift may be determined so that the resulting delay in sampling the input pads is proportional to a length of a trace connected to that pad.

In FIG. 6, four groups of buffers, Groups A, B, X and Y have been arbitrarily designated to provide an illustrative example. Pads 607 of the buffers may be connected to traces in interconnect. For example, as shown in FIG. 6, a plurality of pads 607 of Group A may be connected to the shortest traces in the interconnect. A plurality of pads of Group B may be connected to traces which are slightly longer than the traces to which Group A are connected. Pads of Group X may be connected to the longest traces, and pads of Group Y may be connected to traces which are slight shorter than the traces to which Group X are connected.

Figure 7:
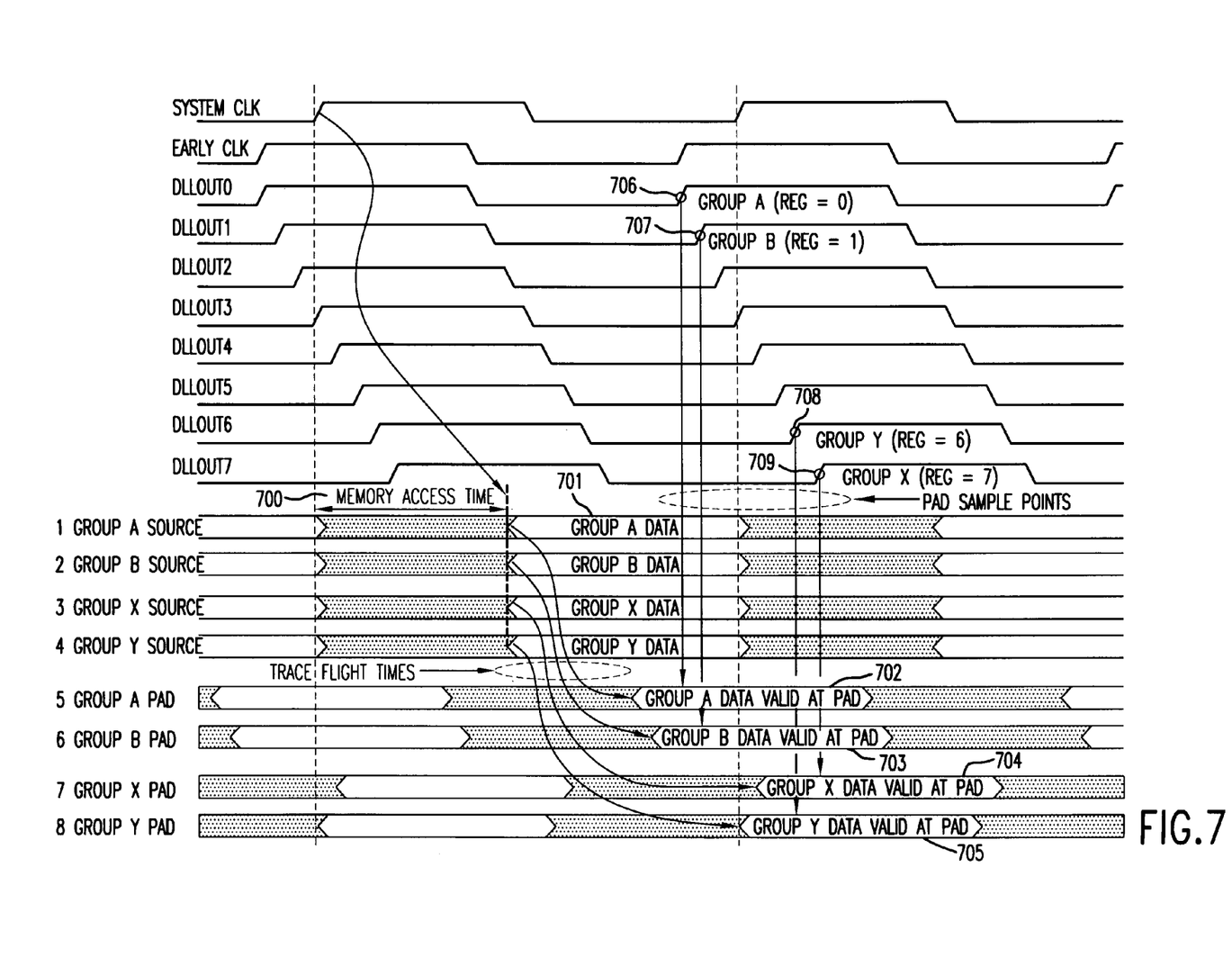
FIG. 7 shows a timing diagram for signals corresponding to the embodiment illustrated in FIG. 6.

FIG. 7 is a timing diagram showing one possible arrangement of phase-shifted clock signals for sampling of data signals arriving at the receiver interface shown in FIG. 6. A data source, represented in lines 1–4 of FIG. 7, for the Group A, B, X and Y signals may be, for example, a memory. A memory access time 700 for each of the signal groups may be uniform.

After the memory access time, Group A, B, X and Y source signals may then begin to propagate across the interconnect to the receiver interface. The Group A, B, X and Y data source signals remain valid at the output buffer of the memory for a period of time 701.

Lines 5–8 in FIG. 7 represent trace flights times for the Group A, B, X and Y signals corresponding to the example trace lengths of FIG. 6. Thus, because the Group A pads are connected to the shortest traces, a "data valid" period 702 for the Group A signals occurs at the receiver interface earliest. Because the Group B pads are connected to traces which are slightly longer than the Group A traces, a "data valid" period 703 for the Group B signals occurs slightly later than period 702. Similarly, because the Group X pads are connected to the longest traces, a "data valid" period 704 for the Group X signals occurs the latest, and because the Group Y pads are connected to traces which are slight shorter than the Group X traces. a "data valid" period 705 for the Group Y signals occurs slightly earlier than period 704.

Clock signals for sampling the data signals during their respective "data valid" periods are shown in FIG. 7. Each of the clock signals DLLOUT0–7 may be a phase-shifted version of an "early CLK" signal that runs ahead of the system clock.

A particular sampling time for data signals arriving at the receiver interface may be selected by programming a particular register to select a desired clock signal. For example, the register 603 which controls the clock input to the Group A latches may be programmed to value 0 to select the DLLOUT0 clock signal, since the DLLOUT0 signal introduces the least delay. Accordingly, a rising edge 706 of the DLLOUT0 signal samples the Group A data signals during the Group A "data valid" period 702. Similarly, the register 603 which controls the clock input to the Group B latches may be programmed to value 1 to select the DLLOUT1 clock signal, since the DLLOUT1 signal introduces slightly more delay than the DLLOUT0 signal. Accordingly, a rising edge 707 of the DLLOUT1 signal samples the Group B data signals during the Group B "data valid" period 703.

Further along these lines, the register 603 which controls the clock input to the Group X latches may be programmed to value 7 to select the DLLOUT7 clock signal, since the DLLOUT7 signal introduces the most delay. Accordingly, a rising edge 709 of the DLLOUT7 signal samples the Group X data signals during the Group X "data valid" period 704. And, the register 603 which controls the clock input to the Group Y latches may be programmed to value 6 to select the DLLOUT6 clock signal, since the DLLOUT6 signal introduces slightly less delay than the DLLOUT7 signal. Accordingly, a rising edge 708 of the DLLOUT6 signal samples the Group Y data signals during the Group Y "data valid" period 705.

It may be appreciated from the foregoing that embodiments of the invention provide programmable control of sampling times for signals at a receiver interface, depending upon the length of respective traces traveled by the signals. Moreover, the timing of sampling could readily be tailored to any distribution of trace lengths in a particular board design layout, by programming the control registers accordingly. The programming of the control registers could be done by software such as the BIOS program.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A computer system comprising:
    a driver interface including a plurality of output buffers;
    a receiver interface coupled to the plurality of output buffers of said driver interface via interconnect, said interconnect comprising a plurality of traces of varying lengths; and
    a programmable delay element coupled to said driver interface, said delay element being programmed to offset switching of said output buffers with respect to each other and to delay switching of said output buffers by a delay corresponding to a length of a trace coupled to a respective buffer.

2. The computer system of claim 1, wherein said delay is inversely proportional to said length.

3. The computer system of claim 1, wherein said delay is proportional to a difference between said length and a length of a longest trace.

4. The computer system of claim 1, wherein said receiver interface is wider than said driver interface.

5. The computer system of claim 1, wherein said driver interface is coupled to a memory controller, and said receiver interface is coupled to memory.

6. The computer system of claim 1, wherein the programmable delay element comprises:
    a phase-shifting device to output a plurality of clock signals phase-shifted with respect to each other; and
    a plurality of selection devices each coupled to the plurality of phase-shifted clock signals;
    the selection devices being programmed to select from among the plurality of phase-shifted clock signals to effect said offset and delay.

7. The computer system of claim 1, wherein no delay is introduced in a signal connected to a longest trace.

8. The computer system of claim 1, wherein said delay element includes a delay locked loop.

9. A computer system comprising:
    a plurality of output latches of a first interface;
    interconnect coupling said output latches to a second interface and comprising a plurality of traces of varying lengths, said traces being configured to propagate signals from said output latches to said second interface;
    a plurality of multiplexers, each multiplexer coupled between a latch of said output latches and a delay element comprising a plurality of variable delay outputs; and
    a plurality of programmable registers, each register coupled to a multiplexer of said multiplexers, said registers being programmable to select one of said plurality of variable delay outputs to offset switching of said output latches with respect to each other and in accordance with a length of a trace that propagates a signal of said latch.

10. The computer system of claim 9, said plurality of variable delay outputs comprising a clock signal and phase-shifted versions of said clock signal.

11. The computer system of claim 9, wherein said first interface is coupled to a memory controller, and said second interface is coupled to memory.

12. A method comprising:
connecting a first interface to a second interface with interconnect comprising traces configured to propagate signals, said traces having varying lengths; and
programming a delay element to offset switching of signals output by said first interface with respect to each other and to delay said signals output by said first interface for propagation to said second interface by a delay corresponding to respective lengths of traces propagating said output signals.

13. The method of claim 12, further comprising:
providing a plurality of variable delay outputs from said delay element; and
selecting one of said plurality in accordance with a length of a trace of said traces.

14. The method of claim 12, wherein said delay is inversely proportional to said respective lengths.

15. The method of claim 12, wherein said delay is proportional to a difference between said respective lengths and a length of a longest trace.

16. The method of claim 12, wherein said programming is performed by software.

17. The method of claim 16, wherein said software is a BIOS program.

18. An interconnect for a computer system, comprising:
a plurality of traces, each having a respective length;
a plurality of programmable delay outputs, each provided on a driver end of one of the traces, and characterized by a delay to offset switching, with respect to each other, of signals coupled to said plurality of traces, the delay corresponding to a difference between the length of the respective trace and the length of a longest trace.

19. The interconnect of claim 18, wherein no delay output is provided for the longest trace.

20. A computer system comprising:
first and second agents; and
an interconnect coupled to the first and second agents and comprising:
a plurality of traces, each having a respective length; and
a plurality of delay outputs, each provided on a driver end of one of the traces, and characterized by a programmable delay to offset switching of outputs of one of said first and second agents with respect to each other and corresponding to a difference between the length of the respective trace and the length of a longest trace.

21. The computer system of claim 20, wherein a terminal end of a trace is at a receiver interface of either of said first and second agents.

22. A method comprising:
connecting a receiver interface to interconnect comprising traces configured to propagate signals, said traces having varying lengths;
providing a plurality of variable delay outputs from a delay element; and
programming said delay element to offset switching of outputs coupled to said interconnect and to delay signals from said outputs received at said receiver interface by a delay corresponding to respective lengths of traces propagating said received signals.

23. The method of claim 22, further comprising:
selecting one of said plurality in accordance with a length of a trace of said traces.

24. The method of claim 22, wherein said delay is directly proportional to said respective lengths.

25. The method of claim 22, wherein said programming is performed by software.

26. The method of claim 25, wherein said software is a BIOS program.

* * * * *